United States Patent
Kostas et al.

[15] 3,656,642
[45] Apr. 18, 1972

[54] BALANCED TRACK-TYPE LOADER CONSTRUCTION

[72] Inventors: James M. Kostas, Peoria; William B. Norick, Joilet; Raymond R. Laughlin, Peoria, all of Ill.

[73] Assignee: Caterpillar Tractor Co., Peoria, Ill.

[22] Filed: Aug. 14, 1969

[21] Appl. No.: 850,171

[52] U.S. Cl. ............................. 214/140, 214/776, 180/54
[51] Int. Cl. ................................................. E02f 3/76
[58] Field of Search .................. 214/140, 773, 774, 775, 776, 214/762, 764, 765, 763

[56] References Cited

UNITED STATES PATENTS

| | | | |
|---|---|---|---|
| 2,846,096 | 8/1958 | Beyerstedt et al. | 214/776 |
| 3,227,300 | 1/1966 | Kampert | 214/674 |
| 3,432,051 | 3/1969 | Borer et al. | 214/775 X |
| 3,484,964 | 12/1969 | Jeffrey, Jr. | 214/672 X |

Primary Examiner—Gerald M. Forlenza
Assistant Examiner—John Mannix
Attorney—Fryer, Tjensvold, Feix, Phillips & Lempio

[57] ABSTRACT

A rigid frame riding on tracks carries forwardly directly lift arms pivoted to towers at the central portion of the vehicle. The engine is disposed over the rear track sprocket axis and is spaced rearwardly from the lift arms providing for an operator's compartment which is between the engine and the arms and which overlaps the front of the engine. Fuel and hydraulic tanks are shaped to conform with the region below the lift arms when the arms are in the lowered position. The construction provides a weight distribution facilitating load handling and provides an operator station combining good visibility, easy access and safety.

6 Claims, 6 Drawing Figures

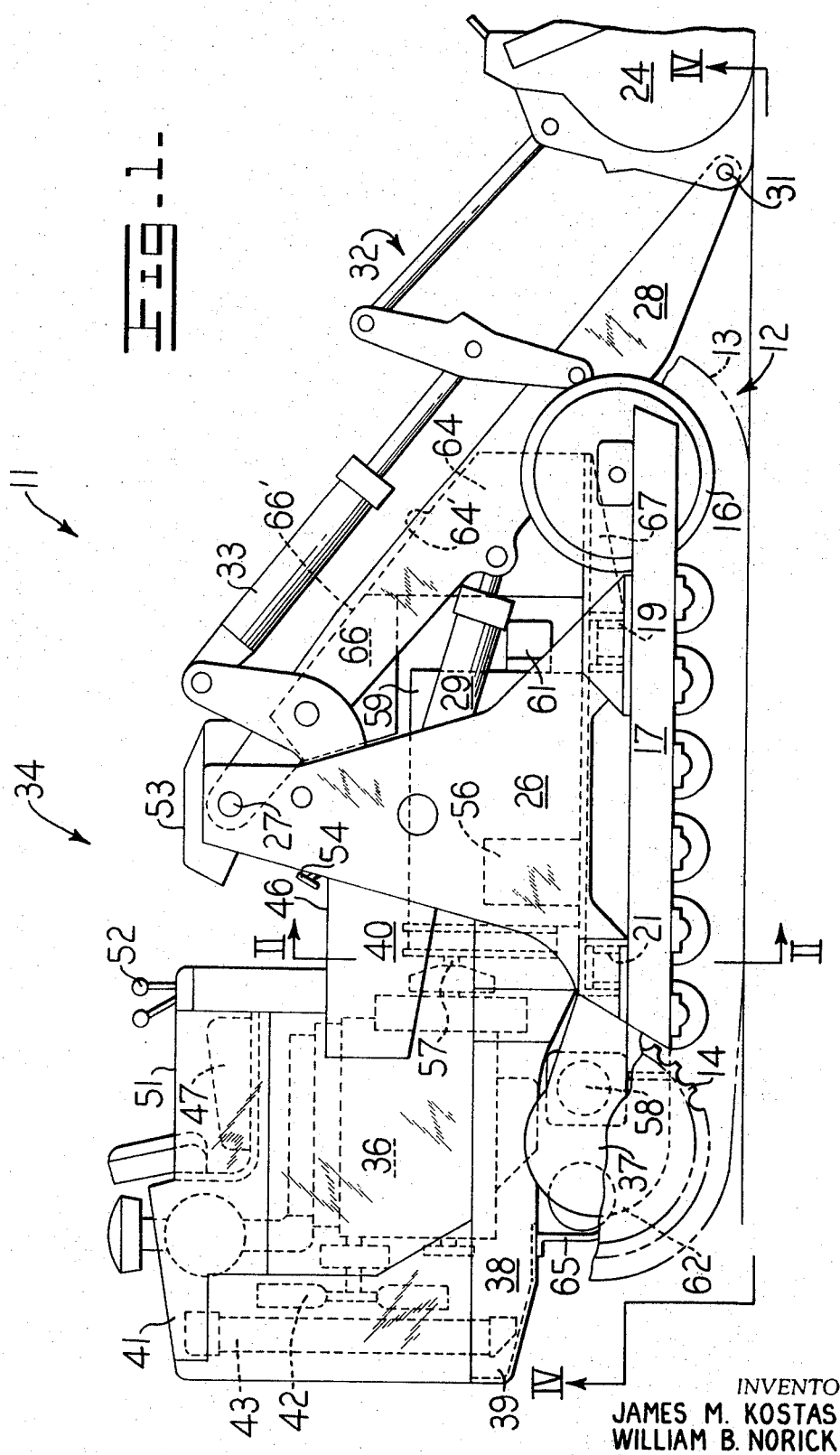

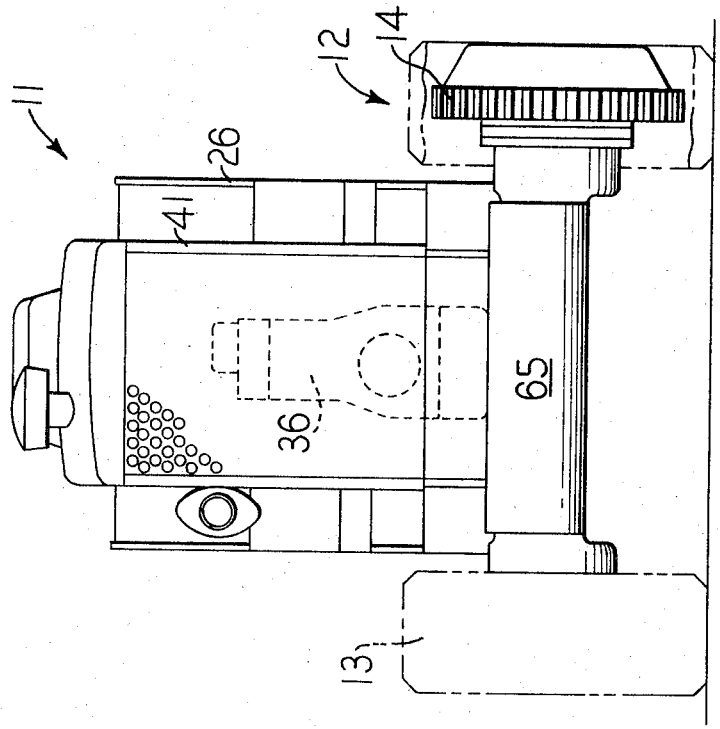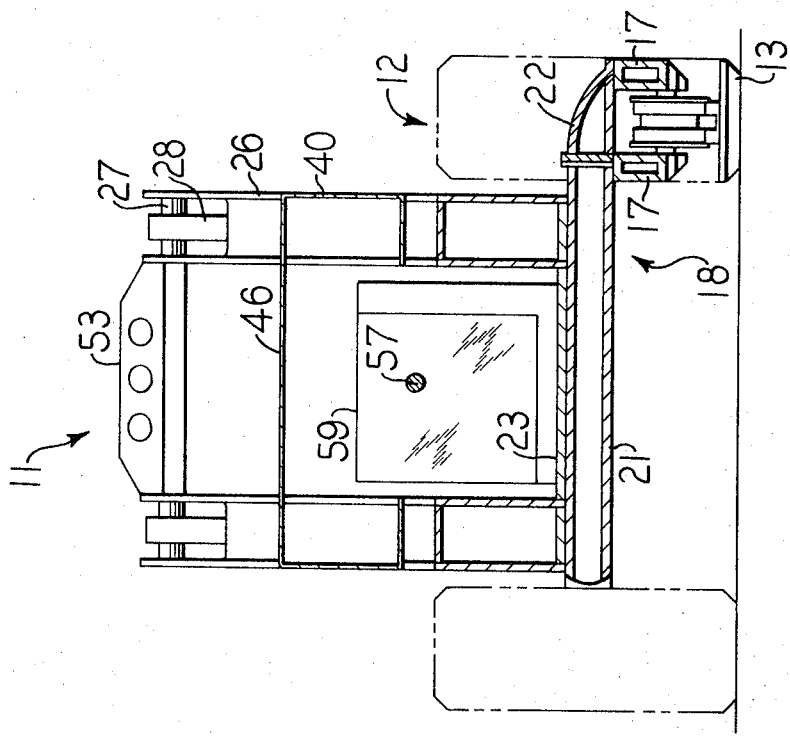

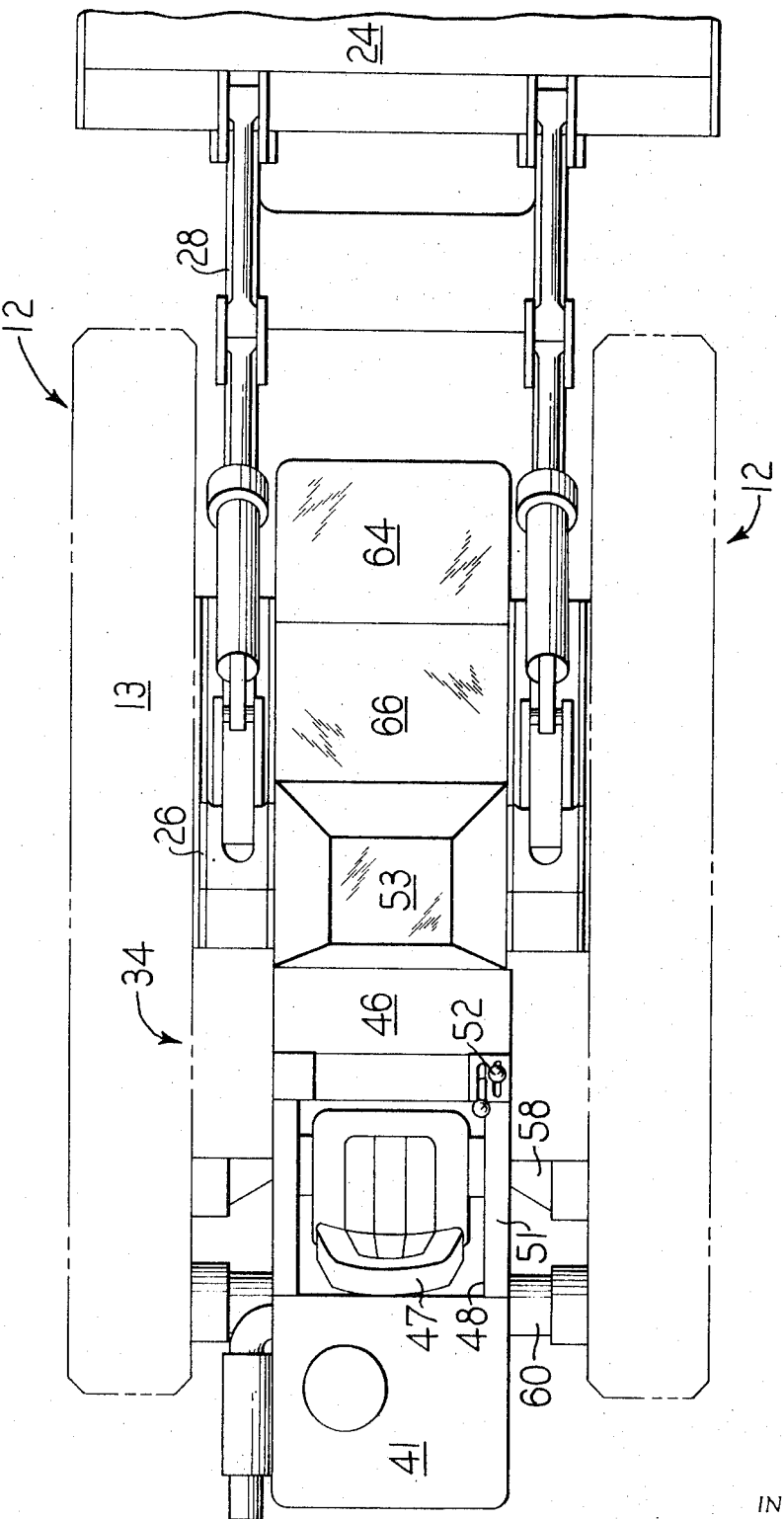

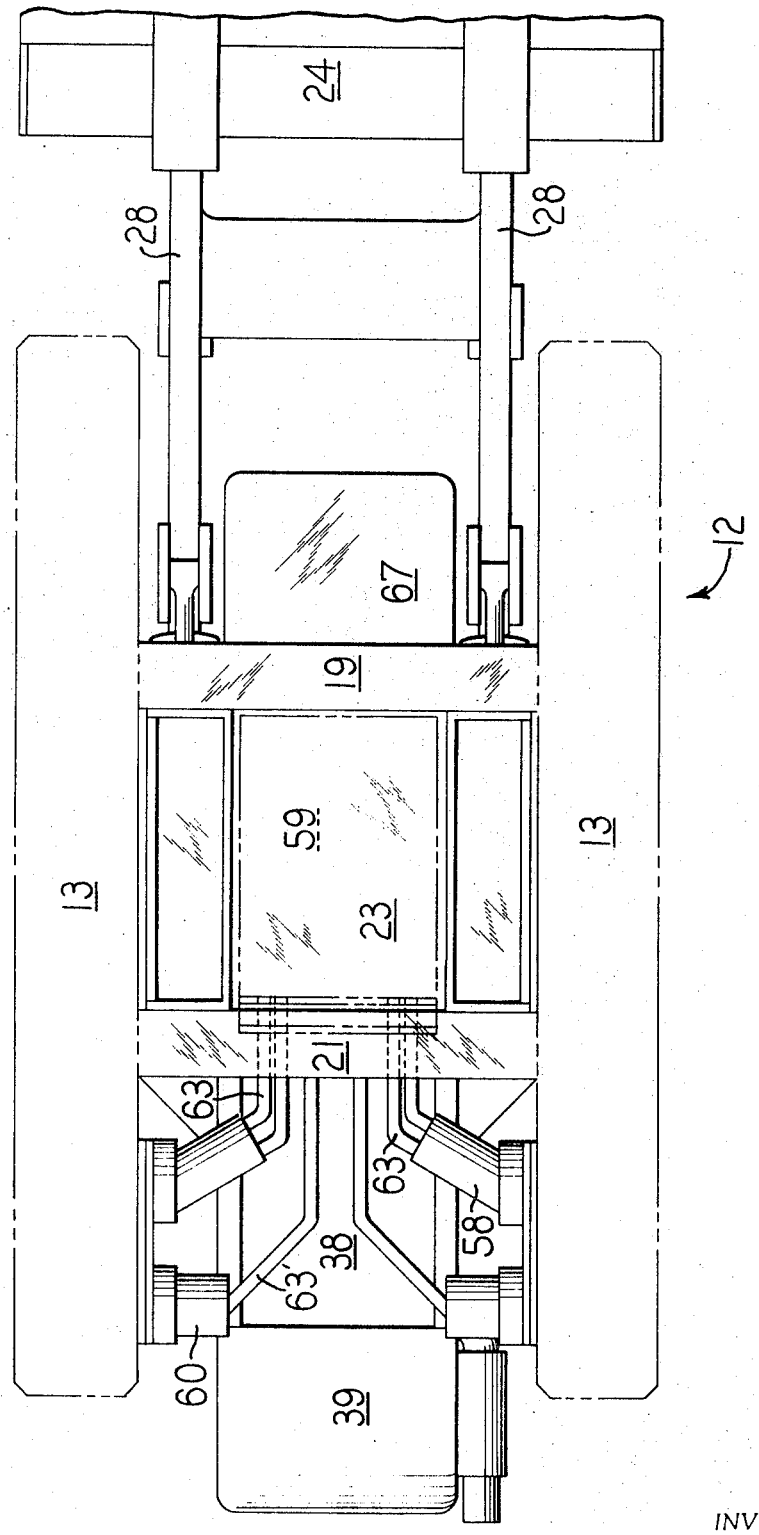

BALANCED TRACK-TYPE LOADER CONSTRUCTION

BACKGROUND OF THE INVENTION

This invention relates to powered apparatus for handling earth or other materials and more particularly to loader vehicles of the class which ride on a pair of endless track mechanisms.

Under certain operating conditions, track type loaders have pronounced advantages over wheel loaders in that greater traction is available for digging into hard materials. Track loaders also offer more floatation, reduced ground pressure per unit area, and are more stable on rough or sloping terrain. However, conventional track loaders are also heavier and more costly for a given load carrying capacity and restrict the operator's view of the work site as well as being limited to relatively low hauling speeds. Certain of these characteristics which compare unfavorably with wheel loaders are due in part to the fact that commercially available track loaders are based on a vehicle which was not specifically designed for coaction with a loader bucket.

In general, commercially available track loaders employ crawler tractor vehicles which were originally designed for other purposes such as drawing agricultural machinery or pushing a bulldozer blade. The engine of such a tractor and the center of gravity thereof is located towards the front of the vehicle as is desirable for many operations. However, this is a very inefficient weight distribution for a loader of the kind having forwardly extending lift arms and a bucket carried thereon.

When the bucket of a front end loader is driven into a heavy or compacted material and the lift controls are actuated, forces are generated which tend to raise the back end of the vehicle. Actual lifting of the rear and central portions of the tracks out of contact with the ground may occur if the forces which resist lifting of the bucket are sufficiently great. The effect creates problems even if the back end of the vehicle does not rise a noticeable amount since, in any case, there is a reduction of traction and floatation and high stresses are concentrated at the forward regions of the track assemblies.

Basically the same factors can create another problem which has still more serious consequences. As noted above, the center of gravity of the conventional crawler tractor is somewhat forward of the center of the tracks and is advanced further by the addition of lift arms, tilt linkage and a loader bucket. If the bucket should be very heavily loaded and then elevated, the center of gravity may be shifted dangerously close to the axis of the front track idlers. This creates a risk that the vehicle will topple forward, particularly in traveling down an incline or as a consequence of a pitching motion upon overriding an obstacle. In practice, such an accident is extremely unlikely. An experienced operator can sense the instability and take steps to reduce the hazard. Further, designers tend to use smaller buckets on a track type loader than the vehicle is theoretically capable of handling in order to avoid any risk of this kind. These limitations on bucket size and use constitute undesirable limitations to the efficiency and productivity of the loader.

Still another significant characteristic of the conventional crawler tractor is that the operator is situated behind the bulky engine. While this does not interfere with the visibility of a drawn load, the operator's view of a work site immediately in front of the vehicle is seriously obstructed, particularly where a loader bucket is present together with lift arms and tilt linkage which must be broadly proportioned to extend along opposite sides of the engine.

Attempts have heretofore been made to resolve these problems by designing a specialized crawler vehicle for loader usage in which the heavy engine is mounted at the rear of the vehicle. As heretofore constructed, such loaders have been characterized by still other problems and have not met with any widespread commercial success. A first difficulty is that the optimum weight distribution in a crawler loader is, in fact, fairly critical and if the center of gravity is too far to the rear, the loader cannot dig efficiently. During digging the lowered, initially empty, bucket must be rammed forwardly into the earth or other material to be handled. The bucket is then tilted slightly and again driven further in the material and the process may be repeated several times.

Efficient digging requires a sizeable force acting to hold the bucket down as the reaction of the material against the bucket can exert a strong lifting force thereon. As the engine is one of the heavier components of the loader, its location is relatively critical in that it must not be too far to the rear just as it should not be as far forward as in a conventional crawler tractor.

Prior crawler loader configurations with rear mounted engines have not succeeded in reconciling the several desiderata. In the absence of an undesirably elongated vehicle, the engine has been too far to the rear or the operator has been situated between the two lift arms which undergo repeated pivoting motions in operation. Generally, both of these undesirable conditions have been present. These prior configurations variously restrict access to the operator's compartment, interfere with visability and subject the operator to risks because of the proximity of the moving lift arm linkages.

SUMMARY OF THE INVENTION

The present invention realizes a weight distribution in a crawler loader which markedly increases stability and load handling efficiency while providing a readily accessible, safe and visually advantageous operator's station.

The invention utilizes a rigid vehicle frame riding on a pair of powered endless track assemblies and has upwardly extending support means intermediate between the ends of the tracks to provide a pivot connection to lift arms which carry the bucket. The engine is situated above the axis of the rear sprockets of the tracks and is spaced rearwardly from the lift arms to provide for the deck of an operator's station behind the lift arms, the operator's seat in a preferred form of the invention, being situated above the forward portion of the engine.

Other heavy components are situated forwardly from the engine below the operator's station and lift arms, the components directly under the lift arms being preferably confined to the region below the inclined plane of the arms when the arms are in the lowered position. In a preferred form of the invention, the fuel tank is near the front of the track assemblies whereby variations in the weight of the tank due to the consumption of fuel do not significantly affect the balance of the vehicle.

Accordingly, it is an object of this invention, to provide a track-type loader vehicle having a favorable weight distribution for facilitating bucket manipulations combined with an advantageously situated operator's station and an advantageous positioning of other components.

It is another object of this invention to provide for the safe handling of heavier loads with a track loader vehicle of given size.

It is a further object of the invention to provide a track type loader configuration with an operator's station combining work site visibility and convenient access and which is removed from close proximity to moving linkages.

The invention, together with further objects and advantages thereof will best be understood by reference to the following description of preferred embodiments in conjunction with the accompanying drawings.

BRIEF DESCRIPTION OF THE DRAWINGS

In the accompanying drawings:

FIG. 1 is a side elevation view of a first embodiment of a crawler loader in accordance with the invention wherein hydraulic drive means are employed to power the track assemblies;

FIG. 2 is a cross-section view of the loader of FIG. 1 taken along line II—II thereof;

FIG. 3 is a plan view of the loader vehicle of FIG. 1;

FIG. 4 is a view of the underside of the loader of FIGS. 1 and 2 taken along lines IV—IV of FIG. 1;

FIG. 5 is a back view of the loader of FIGS. 1 to 4; and

DESCRIPTION OF PREFERRED EMBODIMENTS

Figure 6:
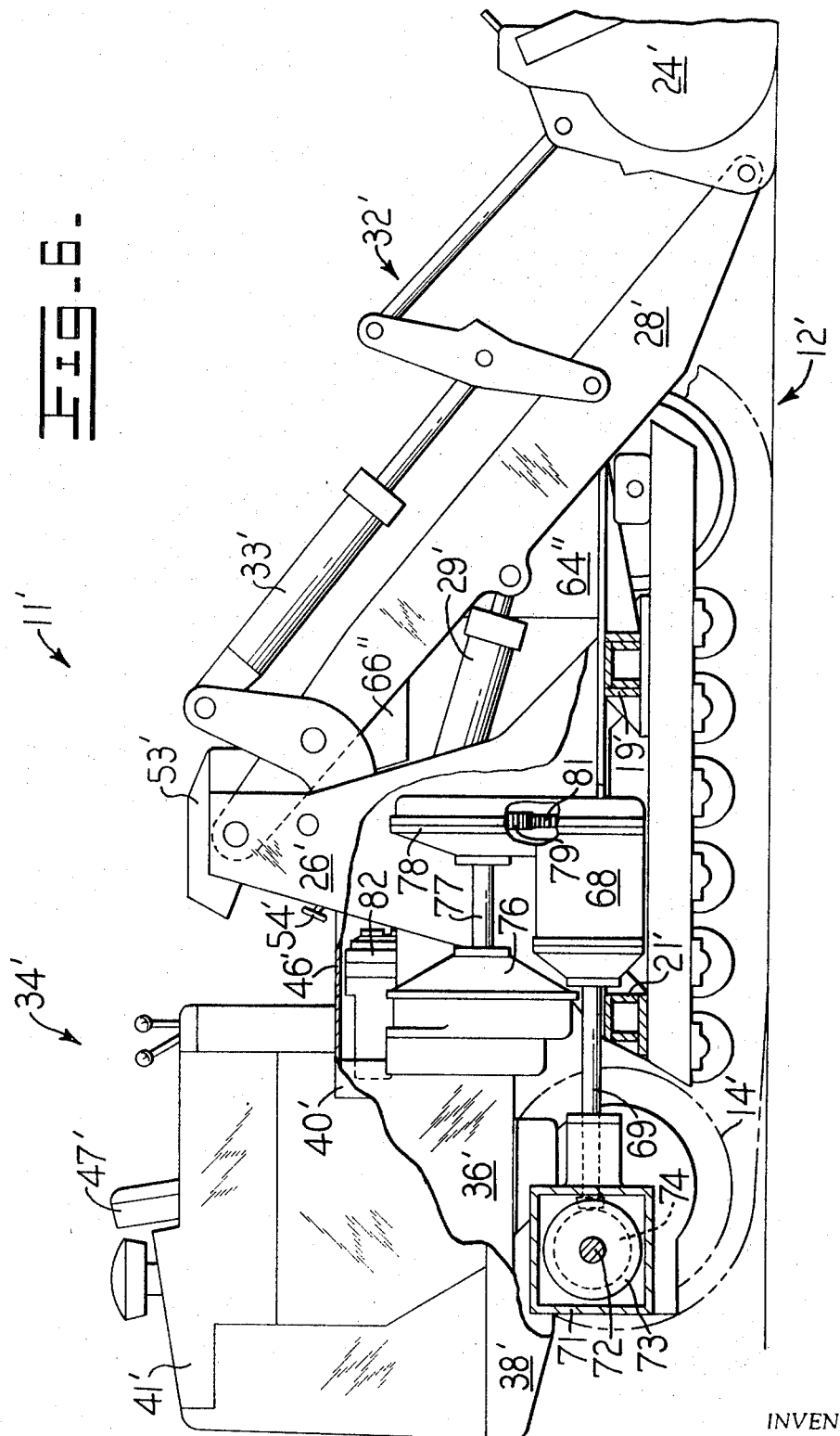
FIG. 6 is a side elevation view, with portions of the structure broken out, of a second embodiment of the invention wherein a planetary transmission and mechanical drive system is utilized to couple the engine to the track assemblies.

Referring now to the drawing and more particularly to FIGS. 1 and 2 in conjunction, there is shown a crawler loader 11 of the class which rides on a pair of endless track mechanisms 12. Each such track mechanism may be of essentially conventional construction except as hereinafter described and thus has an endless track chain 13 carried on a rear drive sprocket 14 and front idler 16 both of which are journalled to a pair of longitudinally extending roller frame members 17.

Unlike many conventional crawler tractors, loader 11 has a definite frame or chassis structure 18 to which the other principal components of the vehicle attach. The chassis includes front and rear hardbar members 19 and 21 respectively which extend transversely of the loader between the roller frame members 17 at each side of the vehicle. Front hardbar 19 is situated to the rear of the front track idlers 16 and rear hardbar 21 is forwardly from the drive sprockets 14. As best illustrated in FIG. 2, which shows the rear hardbar 21, each hardbar is a linear beam having end extensions 22 which span the pair of roller frame members 17 at each side of the vehicle and which are welded or otherwise secured to each thereof whereby the hardbars and roller frames form a rigid high strength unit. A rectangular chassis plate 23 extends between the hardbars 19 and 21 to add additional strength and rigidity and to support other loader components as will hereinafter be described.

To provide for the attachment of a loader bucket 24 to the vehicle, one of a pair of loader towers 26 extends upwardly from each side of chassis 18. Each tower 26 has a generally triangular configuration with the base extending from the front hardbar 19 to the rear hardbar 21 and being rigidly secured to each thereof and to chassis plate 23 as well. Thus, the hardbars 19 and 21, plate 23, roller frame members 17 and towers 26 jointly define a strong unitized frame assembly.

Referring now to FIG. 3 in conjunction with FIG. 1, pivot couplings 27 connect a pair of lift arms 28 to the loader towers 26 with the pivot axis of the couplings being spaced upwardly from the chassis plate 23 and being transverse to the vehicle whereby the forward ends of the arms may be raised and lowered to manipulate bucket 24 in the conventional manner. Lift jacks 29 are coupled between the lift arms 28 and the loader towers to effect such motion. Bucket 24 attaches to the front end of the lift arms 28 at additional pivot connections 31 and conventional tilt linkage 32, including tilt jacks 33, is connected between the bucket and lift arms and the loader towers 26 to provide for controlling the inclination of the bucket relative to the lift arms and to maintain such inclination relatively constant as the arms are raised and lowered.

The loader towers 26 and pivots 27 in this embodiment are proportioned to locate the pivot axis of the lift arms 28 about equidistantly from the front and back ends of the track mechanisms 12. This provides for lift arms 28 of adequate length together with an unobstructed space behind the lift arms for an operator's compartment 34 in an arrangement in which the driving engine 36 is situated over the rotary axis 37 of the rear track sprockets 14 to provide an optimum weight distribution for loader operations.

Referring now to FIG. 4 in conjunction with FIG. 1, the engine 36 is supported on a frame comprised of a pair of members 38 each of which extends to the rear from the base of a separate one of the towers 26. A cross member 39 spans the back ends of the two members 38. A shorter frame member 40 extends rearwardly from a higher location on each tower 26 to provide additional support for the engine housing 41. The engine 36 may be of the diesel variety, for example, and is oriented to locate the fan 42 and radiator 43 at the back end of the vehicle.

The above described construction enables the engine 36 together with the engine housing 41 to be spaced rearwardly from the lift arms 28 thereby providing for unobstructed access to operator's compartment 34 from either side of the vehicle. An operator's deck 46 extends between the upper edges of frame members 40 to define the floor of the forward portion of the operator's compartment 34 at the region between the lift arms 28 and engine housing 41.

Spacing of the engine 36 from the back end of lift arms 28 a distance sufficient to provide for the entire operator's compartment 34 therebetween would have adverse effects. Either the center of gravity would be too far to the rear for optimum balance and stability or else the track mechanisms and chassis would have to be elongated solely for the purpose of improving balance. The present loader configuration avoids both of these undesirable conditions by overlapping the operator's compartment and the engine. The engine 36 and housing 41 is spaced from the lift arms 28 by a distance sufficient only to accommodate the forward portion of the operator's compartment therebetween. The operator's seat 47 at the rear portion of engine 36, the seat being disposed in a recessed region 48 of the engine housing 41. Recess 48 has short sidewalls 51 at either side of seat 47 which may be shaped to constitute arm rests and a portion of the operator's control levers 52 may be mounted at the forward ends thereof. A low hood 53 with an opening at its rear face partially covers the foot pedal controls 54 at the forward edge of deck 46 and defines the forward boundary of the operator's compartment 34 without obstructing the operator's visibility of the bucket 24 and the work site.

The embodiment of the invention illustrated in FIG. 1 utilizes a hydrostatic drive system for transmitting power from the engine 36 to the track mechanisms 12, the detailed structure and operating principles of such a system being described in co-pending application, Ser. No. 645,912 of John R. Cryder, et al., filed June 14, 1967 for Hydrostatic Transmission Control System and assigned to the Assignee of the present application. Major elements of a hydrostatic drive system which must be fitted into the loader configuration of the present invention without interference with other components include a pair of pumps 56 operated through the output shaft 57 of engine 36 and a pair of hydraulic motors 58 each of which is operatively coupled to the rear drive sprocket 14 of a separate one of the track mechanisms 12.

Referring again to FIGS. 1 and 4 in conjunction, a housing 59 is situated between loader towers 26 above chassis plate 23 and below deck 46 to contain the hydrostatic drive pumps 56 and associated elements, an additional pump 61 being mounted at the forward end of the housing for supplying actuating fluid to the various implement manipulating means such as lift jacks 29 and tilt jacks 33.

Each hydraulic motor 58 is secured to a final drive housing 62 carried on the rearward end of the roller frame members 17 of the associated track mechanism 12. As shown in FIG. 4, in particular, hoses 63 transmit hydraulic fluid between the motors 58 and the pump housing 59 and it is an additional advantage of the herein described loader configuration that only short lengths of fluid conduit are required for this purpose. The drive system further includes hydraulically released parking brakes 60 at each track mechanism 12 and additional short hoses 63' couple the brakes to the pump compartment 59 for control purposes. As best shown in FIG. 5, a rear guard plate 65 extends between the final drive housings 62 to protect the drive motors 58, hoses 63 and adjacent components.

The remaining components of substantial size and weight which must be fitted into the loader configuration are tanks including a fuel tank 64 and hydraulic fluid tank 66. These are situated at the forward portion of the vehicle and in keeping with an important aspect of the invention are confined to the region which is below the upper edges of lift arms 28 when the arms are in the lowered position. Thus, the operator's view of the bucket 24 and work site is not obscured as is the case with conventional front engine track loaders.

Referring again to the FIGS. 1 and 3 in conjunction, the fuel tank 64 is situated at the front of the vehicle, on a shelf 67 which extends forwardly from the front hardbar 19, at a location which is almost directly above the rotary axis of the front track idlers 16. The weight of the fuel tank 64 undergoes a very substantial variation in operation as fuel is consumed and by positioning the fuel tank above the region of the front of the tracks in this manner, the effect of the weight variation on the balance of the loader as a whole is minimized.

Hydraulic fluid tank 66 is carried above and behind fuel tank 64 over the most forward portion of pump housing 59 and between lift arms 28.

As indicated above, both the fuel tank 64 and hydraulic fluid tank 66 do not extend above the lift arms 28 when the lift arms are in the lowered or digging position. To maximize tank capacity without violating this condition, both such tanks are formed with slanting top surfaces 64' and 66' which conforms generally with the inclination of the lift arms in the lowered position thereof.

The above described disposition of the major components of a loader 11 results in an optimization of the balance and stability of the vehicle in operation. The placement of the engine 36 at the rear of the vehicle at a position at which it is centered over the rotary axis of the rear track sprockets 14, provides a counterbalance to very heavy loads at the bucket 24 while generating sufficient resistance to upward forces on the bucket to enable efficient digging. Notwithstanding this disposition of the engine, the operator's compartment 34 is accessible from either side of the vehicle without obstruction by the lift arms 28 and the operator is situated to the rear of the lift arms whereby he does not experience any significant hazard from the moving lift arms and associated linkage. In further contrast to the conventional track type loader, access to the engine 36 for servicing or repairs is not obstructed by the lift arms 28 and associated linkage and access to most of the other major components is improved. The hydraulic pumps 56 and related components within compartment 59, for example, may be removed without difficulty. Further, the operator has an excellent view of the work site and of the bucket 24 at its most lowered position.

As described above, the embodiment of the invention shown in FIGS. 1 and 4 employs a hydraulic drive for transmitting power from the engine to the track mechanisms. The general loader configuration is also adaptable to a more conventional mechanical drive system. Referring now to FIG. 6, there is shown a second embodiment of the invention wherein the components of a conventional transmission and mechanical drive line are fitted into the general configuration of the present invention without sacrificing any of the above described operational advantages.

The loader 11' of FIG. 6 has a frame or chassis 18' including loader towers 26' and front and rear hardbars 19' and 21' respectively riding on track mechanisms 12' which are essentially similar to the loader elements hereinbefore described. Lift arms 28' carrying a bucket 24' and tilt linkage 32' are again pivoted to the loader towers 26'. The engine 36' is spaced rearwardly from the lift arms 28' and is situated over the axis of the rear track idlers 14'. This provides for an operator's compartment 34' having a forward portion between the engine and the lift arms and a seat 47' situated over the front end of the engine in the manner previously described.

To transmit drive from engine 36' to the rear track idlers 14', a multi-speed drive transmission 68, preferably of the powershift planetary type, is disposed in the region below operator's deck 46' and immediately forward from the rear hardbar 21' in this particular example and is secured to the chassis 18'. The output shaft 69 of transmission 68 extends rearwardly to a transverse final drive housing 71 to turn a final drive shaft 72 therein, through bevel gearing 73. Shaft 72 transmits power to both rear track sprockets 14' through conventional steering clutches 74, suitable detailed construction for such clutches being known to the art.

Transmission 68 is situated well below the level of deck 46' and forwardly from rear hardbar 21' to provide space immediately forward from the lower portion of the engine, for a torque convertor 76 which coacts with the transmission 68 in a manner well understood in the art. The output shaft 77 of torque convertor 76 extends forwardly above transmission 68 to connect with transfer case gearing 78 which includes a gear 79 engaging the input gear 81 of the transmission. This provides additional space immediately below deck 46' for a pump 82 for supplying hydraulic fluid to the several jacks such as lift jacks 29' and tilt jacks 33'. The hydraulic fluid tank 66" as well as the fuel tank 64" are disposed on the chassis 18' in the region below the upper edges of the lift arms 28', when the arms are in the lowered position, in the manner hereinbefore described.

It will be apparent that still other variations and modifications of the invention are possible within the scope of the following claims.

What is claimed is:

1. A powered loader vehicle comprising:
    a rigid frame,
    a single pair of endless track assemblies disposed one at each side of said frame and attached thereto,
    a lift arm having a rearward end coupled to said frame for pivoting about an axis transverse to said vehicle, said lift arm extending in a generally forward direction from said pivot axis and having load manipulating means at the forward end,
    an engine disposed on said frame in rearwardly spaced relationship to said lift arm,
    means transmitting power from said engine to each of said track assemblies,
    means defining an operator's station having at least a forward portion situated between said lift arm and said engine and wherein said operator is positioned rearwardly from said pivot axis of said lift arm,
    wherein each of said track assemblies have a longitudinally extending roller frame member and wherein said frame of said vehicle further comprises:
    a pair or rigid spaced apart hardbars extending between said roller frame members of said track assemblies, each of said hardbars being rigidly secured to said roller frame members of each of said track assemblies,
    a pair of loader towers one extending upwardly from said hardbars at each side of said vehicle for coupling said lift arm thereto, and
    a member extending rearwardly from said loader towers and the rearmost of said hardbars for supporting said engine.

2. A powered loader vehicle comprising:
    a frame having a central portion with a pair of upwardly extending transversely spaced apart loader towers,
    a pair of endless track assemblies disposed one at each side of said central portion of said frame, each of said track assemblies having a longitudinally extending roller frame member secured to said central portion of said frame and having a drive sprocket and idler mounted on said roller frame member for carrying an endless track chain thereon,
    A pair of lift arms having rearward ends coupled to said loader towers by pivots which provide for pivoting movement of said arms between a forward and downwardly extending position and a forward and upwardly extending position about a pivot axis which is transverse to said vehicle and situated above said central portion of said frame;
    an engine mounted on said frame at a longitudinal position on said vehicle corresponding to that of the rear portions of said track assemblies, and being substantially centered over the rotary axis of said drive sprockets, said engine being spaced rearwardly from said axis of said lift arms and being below the level of said lift arm pivot axis, an operator's station having a operator foot support deck carried on said frame between said engine and said axis of said lift arms, said deck being spaced upwardly from said central portion of said frame to form a compartment therebetween and being below the level of said lift arm pivot axis, said operator's station having a seat spaced above said deck and rearwardly therefrom, said seat being over the forward portion of said engine, means for transmitting power from said engine to said drive sprockets of said track assemblies, said power transmitting means being disposed at least in part in said compartment below said operator's desk, and, at least one tank for carrying a liquid fuel required by said vehicle engine, said tank being carried on said frame below said lift arms and being confined substantially to the region below the upper edges of the lift arms when said arms are in said forwardly and downwardly extending position thereof.

3. A powered loader vehicle as defined in claim 2 wherein said means transmitting power from said engine to each of said track assemblies comprises a hydraulic motor secured to each of said track assemblies in operative relationship thereto, a pump carried on said frame forwardly from said engine and below the level of said operator's station, said pump being coupled to said engine, and conduit means connecting said pump to said hydraulic motors of said track assemblies for supplying fluid under pressure thereto.

4. A powered loader vehicle as defined in claim 2 wherein said means transmitting power from said engine to each of said track assemblies comprises a multi-speed transmission carried on said frame beneath said operator's station and having an input gear coupled to said engine and having an output shaft coupled mechanically to each of said track assemblies.

5. The powered loader vehicle of claim 2 wherein said fuel tank is situated at the forward end of said frame substantially above the rotary axis of the idlers mounted on the roller frame members whereby variations in the weight of fuel in said tank do not significantly effect the balance of said loader with respect to rocking movement about the forward portions of said track assemblies.

6. The powered loader vehicle in accordance with claim 2 wherein a hydraulic fuel tank is positioned above and behind the liquid fuel tank, said hydraulic tank being carried on said frame below said lift arms and being confined substantially to the region below the upper edges of said lift arms when said arms are in said forwardly and downwardly extending extending position thereof.

* * * * *